United States Patent
Heinzman et al.

(10) Patent No.: US 6,854,765 B2
(45) Date of Patent: Feb. 15, 2005

(54) STEERING SHAFT ASSEMBLY

(75) Inventors: Marc William Heinzman, Frankenmuth, MI (US); Michael Patrick Anspaugh, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 71 days.

(21) Appl. No.: 10/252,308

(22) Filed: Sep. 23, 2002

(65) Prior Publication Data

US 2004/0056467 A1 Mar. 25, 2004

(51) Int. Cl.[7] .............................................. B62D 15/02
(52) U.S. Cl. ........................ 280/776; 280/777; 74/493
(58) Field of Search ................................. 280/776, 777, 280/779; 74/493; 464/172

(56) References Cited

U.S. PATENT DOCUMENTS

| | | | | |
|---|---|---|---|---|
| 4,106,311 A | * | 8/1978 | Euler ........................... | 464/77 |
| 4,813,910 A | * | 3/1989 | Stone .......................... | 464/162 |
| 4,833,936 A | * | 5/1989 | Mariani et al. ............... | 74/493 |
| 4,900,059 A | * | 2/1990 | Kinoshita et al. ........... | 280/775 |
| 4,911,034 A | * | 3/1990 | Kulczyk et al. .............. | 74/492 |
| 5,219,045 A | * | 6/1993 | Porter et al. .................. | 188/67 |
| 5,348,345 A | * | 9/1994 | Dykema et al. ............ | 280/777 |
| 5,417,614 A | * | 5/1995 | Dykema et al. ............ | 464/162 |
| 5,509,324 A | * | 4/1996 | Cymbal ....................... | 74/492 |
| 5,560,650 A | * | 10/1996 | Woycik et al. .............. | 280/777 |
| 5,639,177 A | * | 6/1997 | Thomas ....................... | 403/377 |
| 5,761,966 A | | 6/1998 | Cuiller et al. | |
| 5,961,146 A | * | 10/1999 | Matsumoto et al. ........ | 280/777 |
| 5,979,265 A | * | 11/1999 | Kim et al. .................... | 74/493 |
| 6,134,983 A | | 10/2000 | Armstrong et al. | |
| 6,138,525 A | | 10/2000 | Riefe et al. | |
| 6,389,924 B1 | | 5/2002 | Ryne et al. | |
| 6,435,555 B1 | | 8/2002 | Seamon et al. | |
| 6,517,114 B1 | | 2/2003 | Scheib et al. | |
| 6,616,185 B2 | * | 9/2003 | Manwaring et al. ........ | 280/775 |

* cited by examiner

*Primary Examiner*—Paul N. Dickson
*Assistant Examiner*—Toan C To
(74) *Attorney, Agent, or Firm*—Michael D. Smith

(57) ABSTRACT

A steering shaft assembly has a tubular main body and a shaft, with a spring and a sleeve disposed at least partially therebetween. The shaft is disposed at least partially in the tubular main body and the sleeve is disposed at least partially between the spring and the main body. The sleeve acts to urge the spring into frictional contact with the shaft to impart an axial resistance force supporting the shaft against axial displacement in response to application of an axial force on the shaft less than the axial resistance force. The sleeve enables axial displacement of the shaft in response to application of an axial collapsing force exceeding the axial resistance force. In another construction of a steering shaft assembly, a shaft is disposed at least partially in the tubular main body and the spring is disposed at least partially in the tubular main body between the tubular main body and the shaft. The spring acts to impart a radial load between the shaft and the tubular main body. The spring has at least one undulation that provides for linear frictional contact between the spring and the shaft in a circumferential direction about the shaft to resist torsional rotation of the shaft relative to the tubular main body.

15 Claims, 3 Drawing Sheets

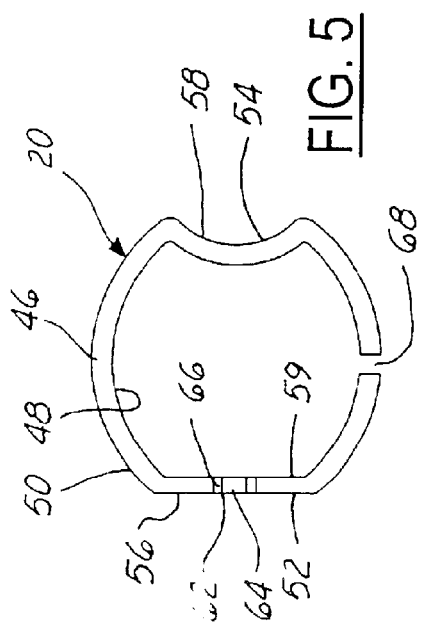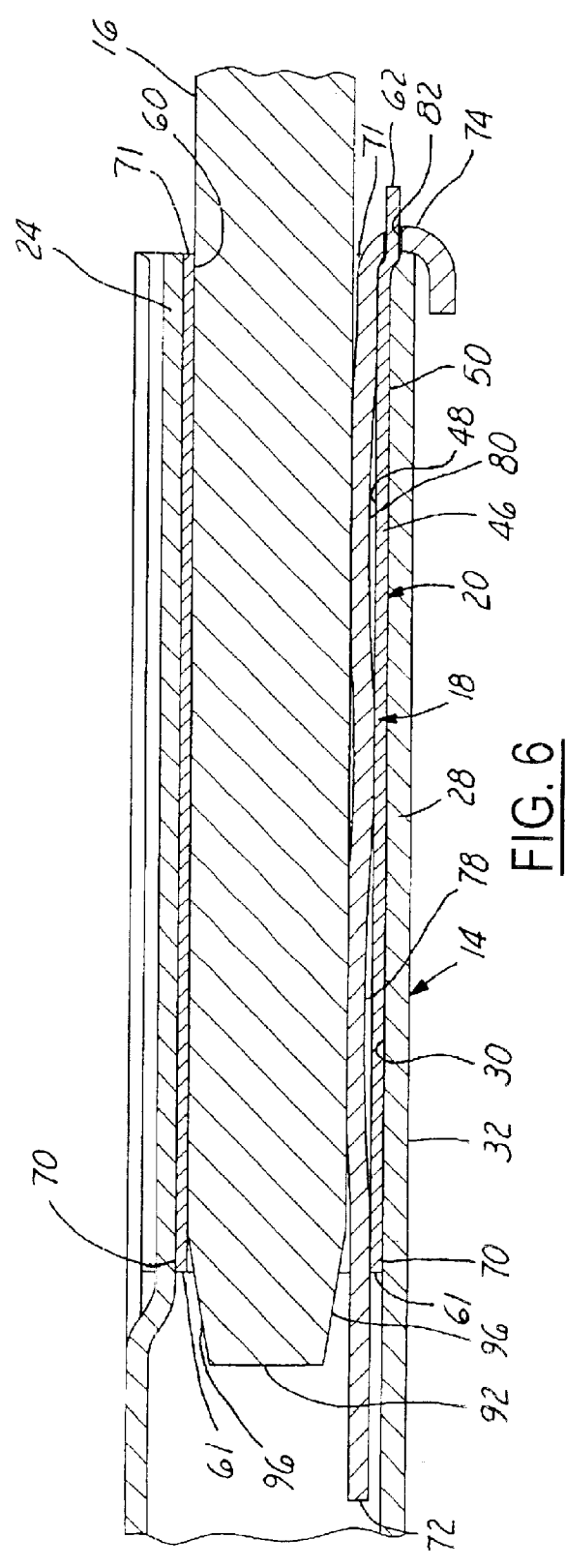

STEERING SHAFT ASSEMBLY

TECHNICAL FIELD

The invention relates generally to steering shaft assemblies, and more particularly to collapsible steering shaft assemblies for use in automobiles.

BACKGROUND OF THE INVENTION

Steering shaft assemblies for automobiles commonly employ steering shafts for collapsible telescoping movement upon encountering a collapsing force. Providing a steering shaft assembly that can collapse helps to minimize injury to a driver of a vehicle when involved in an accident. To achieve telescoping movement between related steering shaft assembly components, typically a tubular main body is joined to a solid shaft utilizing an injection molding process.

To utilize an injection molding process to join the tubular main body to the solid shaft, holes are typically formed in a wall of the tubular main body and in the shaft. Upon injecting the plastic through the respective holes of the tubular main and the shaft, a plastic shear pin or pins formed by the injection molding maintains the main body and the shaft in an axially fixed relation to one another until a collapsing force is encountered of sufficient magnitude to shear the pin(s). Although effective, this approach is labor intensive and costly.

Another known method utilized to fix a tubular main body to a solid shaft is through the use of leaf springs inserted between an inner surface of the main body and an outer surface of the shaft. The leaf springs are formed with a ridge extending longitudinally along the length thereof so that when the leaf springs are inserted between the shaft and the main body, the ridge makes linear contact along the length of the main body to impart a radial load between the shaft and the main body. The leaf springs provide a metal-to-metal contact between the shaft and the main body, and thus, grease is commonly used to ensure proper telescoping movement upon encountering a collapsing force between the shaft and the main body.

With the ridges of the springs traversing between the shaft and the main body in an axial direction, "lash" may result between the shaft and the main body. "Lash" is the term given when relative torsional movement is present between mating steering shaft components, such as between the shaft and the main body. "Lash" is extremely undesirable in a steering shaft assembly, as it reduces the response time of the wheels turning on a vehicle in response to a driver turning a hand wheel connected to the steering shaft assembly. To assist in reducing the amount of "lash" utilizing leaf springs having longitudinally extending ridges, the shaft and main body are typically formed having mating hexagonal shapes. Having to form the shaft and main body in mating hexagonal shapes adds cost to the manufacture of steering shaft assemblies. In addition, the requirement for grease adds cost and inconvenience to the manufacturing process.

SUMMARY OF THE INVENTION

A steering shaft assembly constructed accordingly to a presently preferred embodiment of the invention has a tubular main body and a shaft, with a spring and a sleeve disposed at least partially therebetween. The tubular main body has an upper end and a lower end with an intermediate portion therebetween. A wall of the tubular main body has an inner surface and an outer surface. The shaft is disposed at least partially in the upper end of the tubular main body. The sleeve is disposed at least partially in the upper end of the tubular main body between the spring and the inner surface of the main body. The sleeve acts to urge the spring into frictional contact with the shaft to impart an axial resistance force supporting the shaft against axial displacement within the tubular body in response to application of an axial force on the shaft less than the axial resistance force. The sleeve enables axial displacement of the shaft relative to the tubular main body in response to application of an axial collapsing force exceeding the axial resistance force.

In another construction of a steering shaft assembly constructed according to a presently preferred embodiment of the invention, a tubular main body has a wall with an inner surface and an outer surface and having an upper end and a lower end with an intermediate portion between the upper and lower ends. A shaft is disposed at least partially in the upper end of the tubular main body. A spring is disposed at least partially in the upper end of the tubular main body between the tubular main body and the shaft. The spring acts to impart a radial load between the shaft and the tubular main body. The spring has a first end and a second end defining a longitudinal axis therebetween and has at least one undulation extending generally perpendicular to the longitudinal axis. The undulation provides for linear frictional contact between the spring and the shaft in a circumferential direction about the shaft to resist torsional rotation of the shaft relative to the tubular main body.

One advantage of the present invention is that it provides a more efficient and less costly manufacturing process for collapsible steering shaft assemblies.

Another advantage of the present invention is that grease can be eliminated in the assembly process of collapsible steering shaft assemblies.

Another advantage of the present invention is that it provides a collapsible steering shaft assembly having an improved torsional rigidity.

Another advantage of the present invention is that it provides a collapsible steering shaft assembly having minimal lash.

Another advantage of the present invention is that it provides a collapsible steering shaft assembly having improved telescoping movement upon encountering a collapsing force.

Another advantage of the current invention is that it reduces the amount of machining required to manufacture collapsible steering shaft assemblies, thereby reducing the time and cost associated with manufacturing the collapsible steering shaft assemblies.

BRIEF DESCRIPTION OF THE DRAWINGS

The present invention will now be described, by way of example, with reference to the accompanying drawings, in which:

FIG. 5 is a top view of a sleeve from the steering shaft assembly of FIG. 1; and FIG. 6 is an enlarged cross-sectional top view taken along lines 6—6 in FIG. 4 of the steering shaft assembly of FIG. 1.

DESCRIPTION OF THE PREFERRED EMBODIMENT

Figure 1:
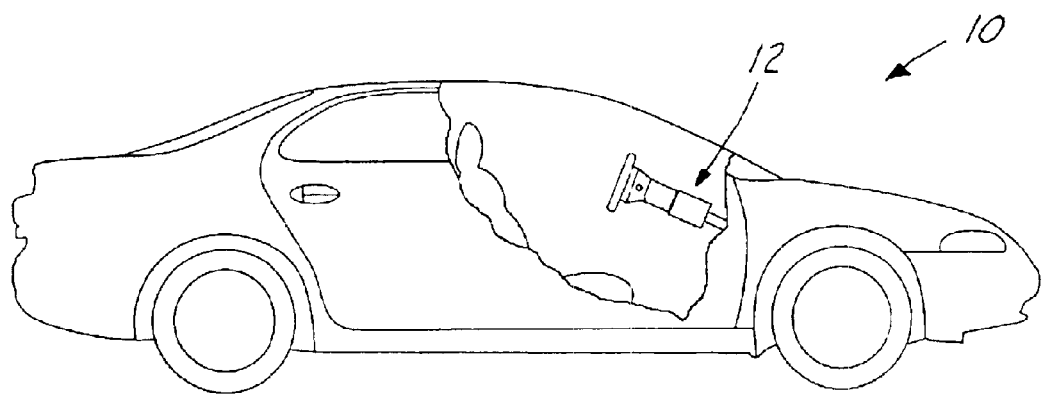
FIG. 1 is an elevation view of a vehicle having a steering shaft assembly embodying a presently preferred construction of the invention.

Referring initially to FIG. 1, a vehicle 10 is equipped with a steering shaft assembly 12 constructed according to a presently preferred embodiment of the invention. The steering shaft assembly 12 has a tubular main body 14, a shaft 16, a spring 18, and preferably a sleeve 20 disposed between the main body 14 and the shaft 16. The spring 18, in combination with the sleeve 20, provides for improved telescoping movement between the main body 14 and the shaft 16 upon encountering a collapsing force. Additionally, the spring 18 has a construction that minimizes the amount of lash within the steering shaft assembly 12.

Figure 2:
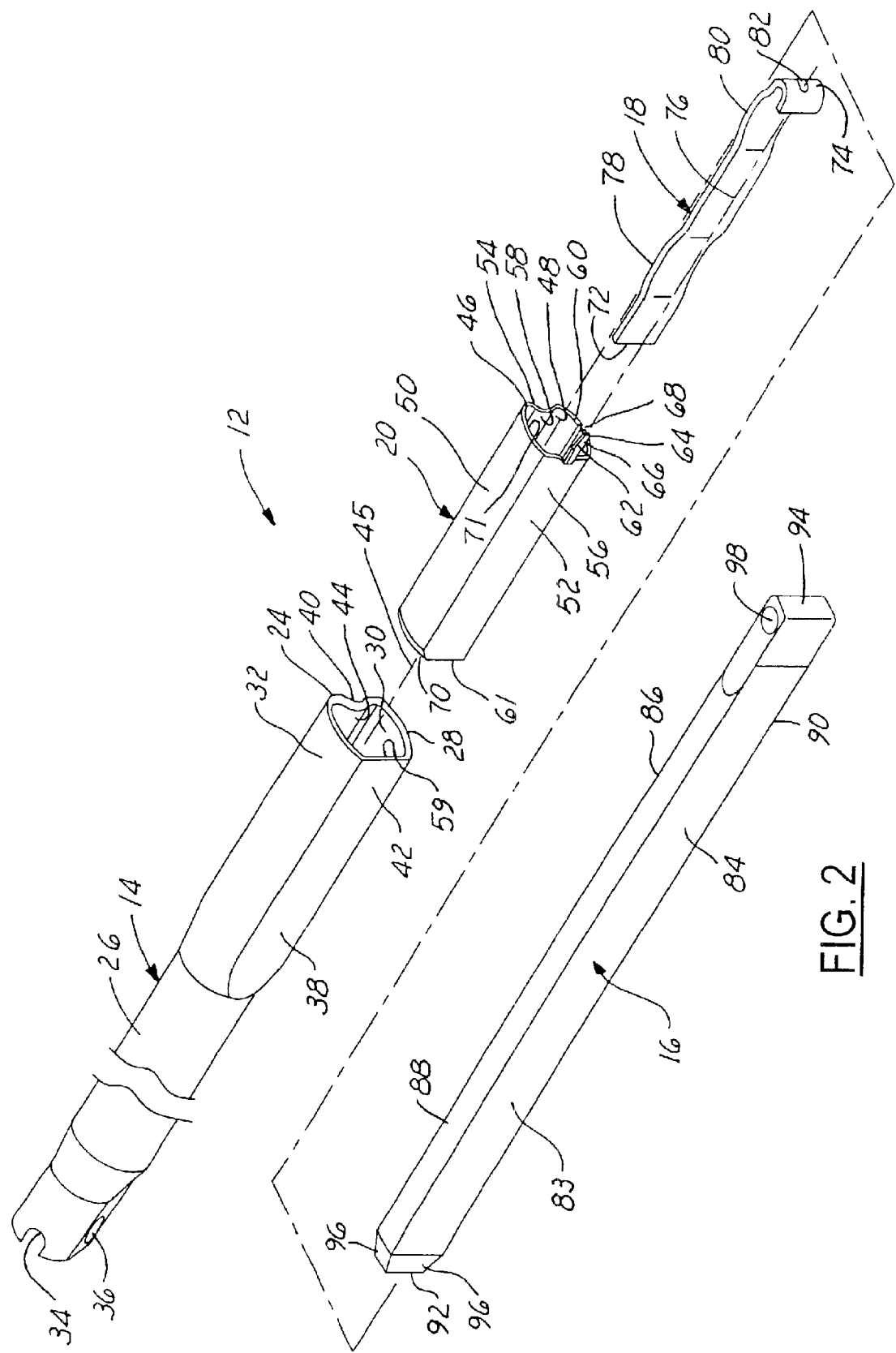
FIG. 2 is an exploded perspective view of the steering shaft assembly of FIG. 1.

The tubular main body 14 has a lower end 22 and an upper end 24 with an intermediate portion 26 therebetween. The tubular main body 14, as shown in FIG. 2, is preferably extruded and has a wall 28 with an inner surface 30 and an outer surface 32. The wall 28 is preferably generally cylindrical in shape, while the lower and upper ends 22, 24 are preferably necked down from the intermediate portion 26. The lower end has a slot 34 and through hole 36 providing for attachment to an intermediate shaft (not shown). The upper end 24 is configured to receive the shaft 16 in assembly. The upper end 24 is shown having a pair of opposite sides 38, 40, wherein one of the sides 38 has a preferably flat portion 42 such that the inner surface 30 and the outer surface 32 have generally parallel surfaces. The other side 40 preferably has an undulation 44 such that the inner surface 30 is convex in form, while the outer surface 32 is concave in form.

The sleeve 20 is shown as being a generally tubular in construction about a longitudinal axis 45 having a wall 46 with an inner surface 48 and an outer surface 50. The outer surface 50 is preferably shaped to conform with the shape of the inner surface 30 of the upper end 24 of the main body 14. Therefore, the outer surface 50 preferably has a pair of generally opposite sides 52, 54 wherein one of the sides 52 is shown having a generally flat portion 56 corresponding to the flat portion 52 of the main body 14. The other side 54 preferably has an undulation 58 corresponding to the undulation 44 of the main body 14. The inner surface 48 is shaped to receive the shaft 16, and preferably has a generally flat portion 59 acting to resist torsional rotation of the shaft 16 relative to the tubular main body 14. The tubular sleeve 20 is constructed so that it can be disposed at least in part in the upper end 24 of the main body 14.

As shown in FIG. 2, the sleeve 20 has axially opposite ends 60, 61 with a finger 62 preferably extending longitudinally from one of the ends 60. The finger 62 has a free end 64 with a tab 66 extending outwardly from preferably opposite sides of the finger 62.

As best shown in FIG. 5, the sleeve 20 preferably has a slit 68 extending longitudinally along the length of the sleeve 20 to facilitate disposing the sleeve 20 within the upper end 24 of the main body 14. To further facilitate assembly of the sleeve 20 within the tubular main body 14, preferably the sleeve 20 has a chamfer 70 formed on the outer surface 50 at one of the ends, shown here as the end 61 opposite the end 60 with the finger 62. Additionally, to facilitate assembly of the shaft 16 within the sleeve 20, preferably a chamfer 71 is formed on the inner surface 48 at the end 60 with the finger 62. The sleeve 20 is preferably formed from acetyl, but it could be formed from other polymeric materials or metals as best suited for the application.

Figure 4:
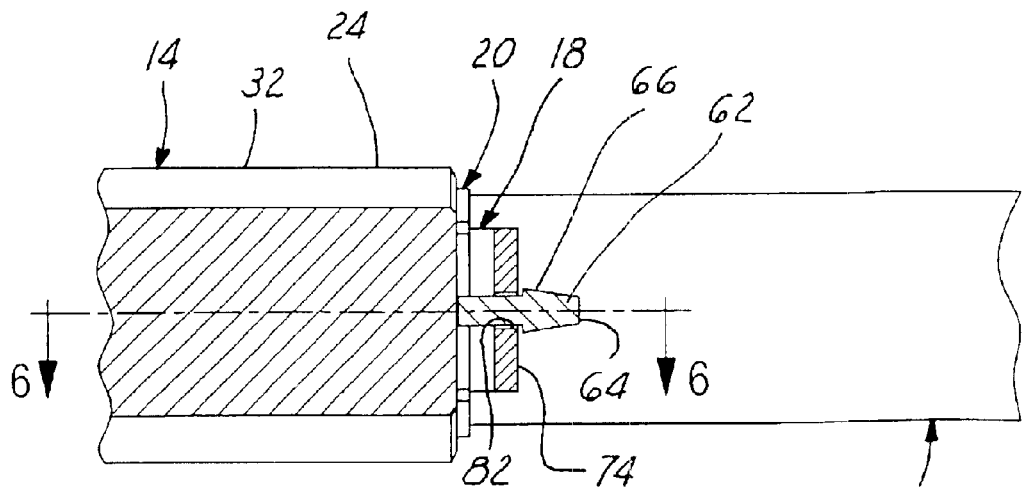
FIG. 4 is an enlarged cross-sectional view taken along lines 4—4 in FIG. 3 of the steering shaft assembly of FIG. 1.

As shown in FIGS. 2 and 4, the spring 18 has a pair of axially opposite ends 72, 74 and a longitudinal axis 76. At least one undulation and preferably a pair of undulations 78, 80 extending generally perpendicular to the longitudinal axis are formed between the ends 72, 74. It should be recognized that though a pair of undulations 78, 80 are shown here, any number of undulations as best suited for the application could be formed between the ends 72, 74. Preferably, one of the ends, shown here as end 74, extends outwardly from the longitudinal axis 76. The end 74 is shown here to be generally u-shaped having an opening 82 formed therethrough. The spring 20 is preferably constructed from spring steel as known in the industry, though it should be recognized that suitable spring materials, including polymeric materials, may be used in constructing the spring 18.

The shaft 16 is shown here as a generally solid shaft having an outer surface 83 with a pair of opposite sides 84, 86 having generally flat portions and parallel to one another. The shaft 16 has a top surface 88 and a bottom surface 90, each preferably being generally convex in shape and conforming to the shape of the inner surface 48 of the sleeve 20. The shaft has opposite ends 92, 94, with end 92 preferably having chamfered sides 96 to facilitate disposing the shaft 16 within the sleeve 20 and the main body 14 during assembly. The other end 94 preferably has an opening 98 for attachment to an upper steering shaft (not shown).

Assembly

The spring 18 is disposed within the sleeve 20 so that the spring abuts the flat portion 56. As shown in FIG. 6, upon disposing the spring 18 within the sleeve 20, the finger 62 preferably extends through the opening 82 so that the tab 66 of the finger 62 extends through the opening 82 to lock the spring 18 to the sleeve 20. It should be recognized that, in service, the finger may be bodily deflected to remove the spring 18 from the sleeve 20.

Upon disposing the spring 18 within the sleeve 20, the sleeve 20 is preferably disposed within the tubular main body 14. To facilitate disposing the sleeve 20 and spring 18 within the upper end 24 of the main body 14, the sleeve 20 may be compressed radially inwardly as a result of the slit 68 extending longitudinally along the sleeve 20. The sleeve 20 is disposed axially within the upper end 24 until the upper end 24 preferably abuts the u-shaped end 74 of the spring 18. This helps ensure that the sleeve 20 and spring 18 subassembly are properly located within the main body 14.

Preferably, the shaft 16 is disposed within the sleeve 20 and main body 14 by pressing the end 92 of the shaft 16 within the sleeve 20. This is preferably done through the use of an automated machine, thereby ensuring that the shaft 16 is disposed the proper distance within the sleeve 20 and main body 14. The chamfered sides 96 guide installation of the shaft 16 within the sleeve 20, and thus the main body 14. As the shaft 16 is disposed within the sleeve 20, the undulations 78, 80 on the spring 18 act to impart a radial force on the side 84 of the shaft 16. The axial resistance force imparted by the spring 18 supports the shaft 16 against axial displacement within the tubular main body 14 after assembly in response to an application of an axial force on the shaft 16 wherein the axial force is less than the axial resistance force. Alternatively, the axial resistance force imparted by the spring 18 provides for axial displacement of the shaft 16 relative to the main body 14 in response to an application of an axial collapsing force wherein the axial collapsing force exceeds the axial resistance force.

Figure 3:
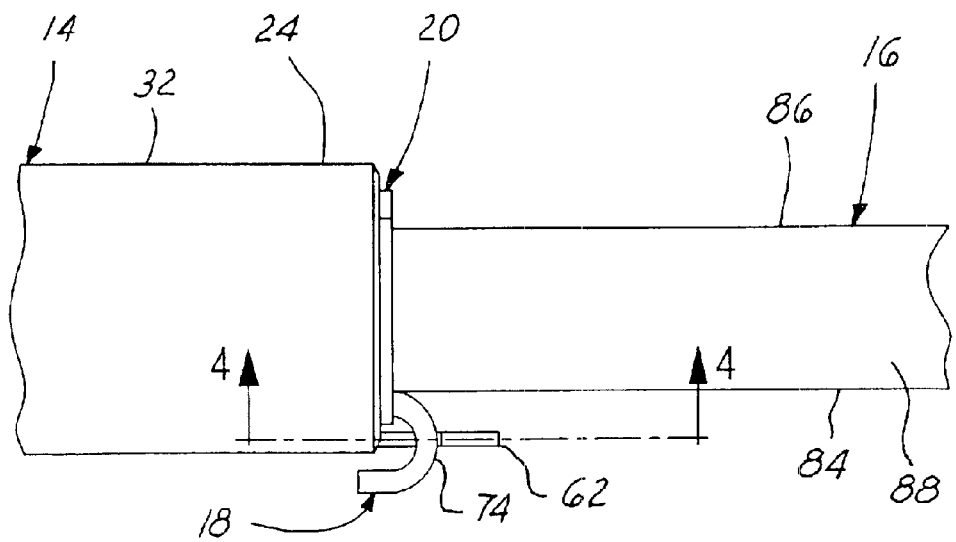
FIG. 3 is an assembled partial plan view of the steering shaft assembly of FIG. 1.

Upon assembly of the steering shaft assembly 12, as shown in FIG. 3, the undulations 78, 80 of the spring 18 provide for linear frictional contact between the spring 18 and the shaft 16 in a circumferential direction about the shaft 16, as shown in FIG. 4. The frictional contact between the spring 18 and the shaft 16 acts to resist rotation of the shaft 16 relative to the tubular main body 14 while a relative torsional force is applied therebetween. As a result, torsional "lash" between the shaft 16 and the main body 14 is limited. To further limit "lash" between the shaft 16 and the main body 14, the generally flat portion 56 of the sleeve 20 mates with the flat portion 42 of the upper end 24 of the main body 14 and the undulation 58 of the sleeve 20 mates with the undulation 44 of the upper end 24 of the main body 14.

During a collapsing condition of the steering shaft assembly 12, such as that encountered when a vehicle is involved in an accident, the shaft 16 moves telescopically relative to the tubular main body 14. To promote telescoping movement of the shaft 16 relative to the main body 14 under a collapsing force, the sleeve 16 is preferably fabricated from a lubricious material such as acetyl to facilitate slideable movement between the shaft 16 and the sleeve 20. A lubricious material like acetyl eliminates the need to incorporate grease in the steering shaft assembly 12. To further facilitate telescoping movement of the shaft 16 relative to the main body 14, the spring 18 and sleeve 20 are inhibited from axial movement relative to the main body 14 as a result of the sleeve 20 being locked to the spring 18, and the spring 18 engaging the main body 14 via the end 74 of the spring 18.

Obviously, many modifications and variations of the present invention are possible in light of the above teachings. It is therefore, to be understood that within the scope of the appended claims, the invention may be practiced otherwise than as specifically described. The invention is defined by the claims.

What is claimed is:

1. A steering shaft assembly comprising:
   a tubular main body having a wall with an inner surface and an outer surface and having an upper end and a lower end with an intermediate portion between said upper and lower ends;
   a shaft disposed at least partially in said upper end of said tubular main body;
   a spring disposed at least partially in said upper end of said tubular main body; and
   a sleeve disposed at least partially in said upper end of said tubular main body between said spring and said inner surface of said tubular main body, said sping being fixed axially to at least one of said tubular main body and said sleeve, said sleeve acting to urge said spring into frictional contact with said shaft and imparting an axial resistance force supporting said shaft against axial displacement within said tubular main body in response to application of an axial force on said shaft less than said axial resistance force, and enabling axial displacement of said shaft relative to said tubular main body and said spring in response to application of an axial collapsing force exceeding said axial resistance force.

2. The steering shaft assembly of claim 1 wherein said sleeve has an end and a finger extending from said end and said spring has a first end with an opening passing through said first end enabling insertion of said finger through said opening to maintain said spring within said sleeve.

3. The steering shaft assembly of claim 1 wherein said inner surface of said upper end of said tubular main body has a generally flat portion acting to resist rotation of said sleeve and said shaft relative to said tubular main body.

4. The steering shaft assembly of claim 3 wherein said sleeve has a wall with an outer surface and an inner surface, said outer surface having a generally flat portion for mating with said generally flat portion of said tubular main body further acting to resist rotation of said sleeve and said shaft relative to said tubular main body.

5. The steering shaft assembly of claim 1 wherein said sleeve has a wall with an outer surface and an inner surface, said inner surface having a generally flat portion acting to resist rotation of said shaft relative to said tubular main body.

6. The steering shaft assembly of claim 5 wherein said shaft has an outer surface, said outer surface having a generally flat portion for mating with said generally flat portion of said sleeve further acting to resist rotation of said sleeve and said shaft relative to said tubular main body.

7. The steering shaft assembly of claim 1 wherein said spring has a first end and a second end defining a longitudinal axis therebetween, said spring having at least one undulation between said first and second ends acting to impart a radial load between said shaft and said tubular main body.

8. The steering shaft assembly of claim 7 wherein said at least one undulation extends generally perpendicular to said longitudinal axis of said spring providing for linear frictional contact between said spring and said shaft in a circumferential direction about said shaft acting to resist rotation of said shaft relative to said tubular main body.

9. The steering shaft assembly of claim 1 wherein said spring has a first end and a second end defining a longitudinal axis therebetween, said first end extending outwardly from said longitudinal axis acting to abut said upper end of said tubular main body upon disposing said spring in said tubular main body providing location of said spring relative to said tubular main body and restricting axial movement of said spring relative to said tubular main body.

10. The steering shaft assembly of claim 9 wherein said first end of said spring is generally u-shaped.

11. A steering shaft assembly comprising:
    a tubular main body having a wall with an inner surface and an outer surface and having an upper end and a lower end with an intermediate portion between said upper and lower ends;
    a shaft disposed at least partially in said upper end of said tubular main body;
    a spring disposed at least partially in said upper end of said tubular main body between said tubular main body and said shaft and fixed axially to said main body and acting to impart a radial load between said shaft and said tubular main body, said spring having a first end and a second end defining a longitudinal axis therebetween and having at least one undulation extending generally perpendicular to said longitudinal axis providing for linear frictional contact between said spring and said shaft in a circumferential direction about said shaft acting to resist torsional rotation of said shaft relative to said tubular main body.

12. The steering shaft assembly of claim 11 wherein said first end of said spring extends outwardly form said longitudinal axis acting to abut said upper end of said tubular main body upon disposing said spring in said tubular main body providing location of said spring relative to said tubular main body and restricting axial movement of said spring relative to said tubular main body.

13. The steering shaft assembly of claim 12 wherein said first end of said spring is generally u-shaped.

14. A steering shaft assembly comprising:

a tubular main body having a wall with an inner surface and an outer surface and having an upper end and a lower end with an intermediate portion between said upper and lower ends;

a shaft disposed at least partially in said upper end of said tubular main body;

a spring disposed at least partially in said upper end of said tubular main body; and a sleeve disposed at least partially in said upper end of said tubular main body between said spring and said inner surface of said tubular main body acting to urge said spring into frictional contact with said shaft and imparting an axial resistance force supporting said shaft against axial displacement within said tubular main body in response to application of an axial force on said shaft less than said axial resistance force, and enabling axial displacement of said shaft relative to said tubular main body in response to application of an axial collapsing force exceeding said axial resistance force, said sleeve having an end and a finger extending from said end and said spring having a first end with an opening passing through said first end enabling insertion of said finger through said opening to maintain said spring within said sleeve.

15. A steering shaft assembly comprising:

a tubular main body having a wall with an inner surface and an outer surface and having an upper end and a lower end with an intermediate portion between said upper and lower ends;

a shaft disposed at least partially in said upper end of said tubular main body;

a spring disposed at least partially in said upper end of said tubular main body; and a sleeve disposed at least partially in said upper end of said tubular main body between said spring and said inner surface of said tubular main body acting to urge said spring into frictional contact with said shaft and imparting an axial resistance force supporting said shaft against axial displacement within said tubular main body in response to application of an axial force on said shaft less than said axial resistance force, and enabling axial displacement of said shaft relative to said tubular main body in response to application of an axial collapsing force exceeding said axial resistance force, said spring having a first end and a second end defining a longitudinal axis therebetween, said first end extending outwardly from said longitudinal axis acting to abut said upper end of said tubular main body upon disposing said spring in said tubular main body providing location of said spring relative to said tubular main body and restricting axial movement of said spring relative to said tubular main body.

* * * * *